Patented Apr. 7, 1953

2,634,297

UNITED STATES PATENT OFFICE 2,634,297

BIS(2-HYDROXY-α-METHYLBENZYL) BENZENES

Clarence L. Moyle, Clare, Mich., assignor to The Dow Chemical Company, Midland, Mich., a corporation of Delaware No Drawing. Application February 18, 1952, Serial No. 272,257

4 Claims. (Cl. 260—619)

The present invention is concerned with the bis(2-hydroxy-α-methylbenzyl)benzenes of the formula

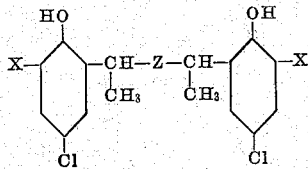

wherein Z represents a member of the group consisting of the meta- and para-phenylene radicals and X represents a member of the group consisting of chlorine, methyl and hydrogen. The new compounds are oily liquids or soft solid materials, somewhat soluble in many organic solvents and substantially insoluble in water. They have been found to exert a strong antimicrobial action against bacteria and fungi and may be employed as preservatives for paper, cellulose textiles, leather goods and fruit.

The new compounds may be prepared by reacting one molecular proportion of meta- or para-di(α-chloroethyl)benzene with at least two molecular proportions of a chlorophenol of the formula

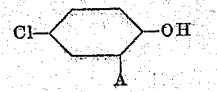

wherein the symbol A represents a member of the group consisting of chlorine, methyl and hydrogen. The reaction is carried out in the presence of a dehydrohalogenation catalyst such as zinc chloride. The reaction is somewhat exothermic and takes place smoothly at the temperature range of from 80° to 160° C. In practice, it is preferred to employ a molecular excess of the chlorophenol reactant.

In carrying out the reaction, the chlorophenol reactant and zinc chloride catalyst are mixed together and the di(α-chloroethyl)benzene added portionwise thereto over a short period of time. The reaction takes place smoothly with the production of the desired product and the evolution of hydrogen chloride of reaction. The addition is carried out at a temperature of from 80° to 120° C. and the temperature subsequently raised to from 140° to 160° C. for a short period of time to complete the reaction. Following the reaction, the desired product may be separated by fractional distillation under reduced pressure.

In an alternative method, the bis(2-hydroxy-3,5-dichloro-α-methylbenzyl)benzenes may be prepared by the direct chlorination of the bis(2-hydroxy-5-chloro-α-methylbenzyl)benzenes whereby one chlorine atom is substituted on each phenol ring ortho to the hydroxyl group. In carrying out the chlorination, the bis(2-hydroxy-5-chloro-α-methylbenzyl)benzene is dispersed in a non-reactive solvent, such as carbon tetrachloride, and chlorine added portionwise thereto until two molecular equivalents thereof have been introduced into the reaction zone. The addition is carried out with stirring and at a temperature of from 20° to 40° C. Following the reaction, the desired product may be separated by fractional distillation under reduced pressure.

The following examples illustrate the invention but are not to be construed as limiting.

EXAMPLE 1

*Bis(2-hydroxy-5-chloro-α-methylbenzyl)benzene*

180 grams (1.4 moles) of 4-chlorophenol and 10 grams of anhydrous zinc chloride were mixed together and 40.6 grams (2 moles) of a mixed di(α-chloroethyl)benzene product (boiling at 65°–80° C. at 0.12–0.53 millimeter pressure and consisting essentially of 75 percent of the meta isomer and 25 percent of the para isomer) was added portionwise thereto over a period of about 75 minutes. The addition was carried out with stirring and at a temperature of from 81° to 101° C. Following the addition, the reaction mixture was heated for a short period of time at gradually increasing temperatures up to a temperature of 122° C. to complete the reaction. The crude reaction product was then diluted with 25 milliliters of chlorobenzene and the resulting mixture washed with dilute aqueous hydrochloric acid. The washed product was then fractionally distilled under reduced pressure to obtain a bis(2-hydroxy-5-chloro-α-methylbenzyl)benzene product as a soft orange solid having a boiling range of from 235° to 255° C. at 3 millimeters pressure, a density of 1.20 at 25° C. and a chlorine content of 19.1 percent as compared to a theoretical content of 18.4 percent.

EXAMPLE 2

*Para-bis(2-hydroxy-5-chloro-α-methylbenzyl)benzene*

257 grams (2 moles) of 4-chlorophenol and 20 grams of anhydrous zinc chloride were mixed together and 60.9 grams (3 moles) of para-bis(α-chloroethyl)benzene (boiling at 110°–116° C. at 2.8–6.4 millimeters pressure) added portionwise thereto over a period of 45 minutes. The addition was carried out with stirring and at a temperature of from 81° to 95° C. Following the addition, the reaction mixture was heated over a period of 15 minutes at gradually increasing temperatures up to a temperature of 155° C. to complete the reaction. The reaction mixture was then cooled to 130° C. and diluted with 50 milliliters of chlorobenzene. The resulting mixture was then successively washed with dilute aqueous hydrochloric acid, and water, and thereafter fractionally distilled under reduced pressure to separate a para-bis(2-hydroxy-5-chloro-α-methylbenzyl)benzene product as a viscous orange oil boiling at from 267°–276° C. at 2 millimeters pressure.

EXAMPLE 3

*Bis(2 - hydroxy - 5 - chloro-3-methyl-α-methylbenzyl) benzene*

32.4 grams (0.3 mole) of 4-chloro-o-cresol and 2.7 grams of zinc chloride were mixed together and 20.3 grams (0.5 mole) of the di(α-chloroethyl)benzene product described in Example 1, added portionwise thereto at gradually increasing temperatures up to a temperature of 98° C. The addition was carried out with stirring and over a period of 2 hours. The reaction mixture was set aside for 48 hours and thereafter washed with water. The washed mixture was then diluted with a methanol solution of dilute aqueous sodium hydroxide, and the latter mixture neutralized with dilute aqueous hydrochloric acid. The neutralized mixture separated into an aqueous layer and an oily layer. The latter was separated and fractionally distilled under reduced pressure to separate a bis(2-hydroxy-5-chloro-3-methyl-α-methylbenzyl)benzene product as a soft orange solid having a boiling range of from 260° to 275° C. at 2.5 millimeters pressure and a molecular weight of 402.1 as compared to a theoretical molecular weight of 414.2.

EXAMPLE 4

*Bis(2 - hydroxy - 3,5 - dichloro - α - methylbenzyl) benzene*

20 grams (0.05 mole) of the bis(2-hydroxy-5-chloro-α-methylbenzyl)benzene product of Example 1, was dissolved in 50 milliliters of carbon tetrachloride and the resulting mixture placed in a flask equipped with a stirrer, reflux condenser and a chlorine inlet. Chlorine gas was thereafter introduced into this mixture at room temperature over a period of one and one-half hours and until no further additional amounts of chlorine were absorbed by the mixture. The carbon tetrachloride was then removed by evaporation and the resulting product fractionally distilled under reduced pressure to obtain a bis(2-hydroxy-3,5-dichloro-α-methylbenzyl)benzene product as a viscous orange oil having a boiling range of from 275° to 286° C. at 5 millimeters pressure and a density of 1.31 at 30° C.

The di(α-chloroethyl)benzenes employed as starting materials may be prepared by reacting meta- or para-divinyl benzene or a mixture of said isomers with hydrochloric acid, to add one chlorine atom on the alpha carbon atom and one hydrogen atom on the beta carbon atom of each vinyl group. In carrying out the reaction, two molecular proportions of the hydrochloric acid is added portionwise to one molecular proportion of the divinyl benzene reactant with stirring. The reaction is somewhat exothermic and takes place smoothly at from about 15° to 35° C. Following the reaction, the desired product may be separated by conventional methods.

I claim:

1. A bis(2-hydroxy-α-methylbenzyl)benzene of the formula

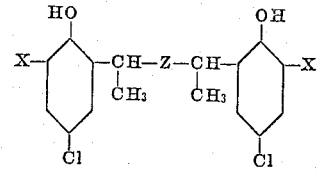

wherein Z represents a member of the group consisting of the meta- and para-phenylene radicals and X represents a member of the group consisting of chlorine, methyl and hydrogen.

2. Para-bis(2 - hydroxy - 5 - chloro-α-methylbenzyl) benzene.

3. Bis(2 - hydroxy-5-chloro-3-methyl-α-methylbenzyl)benzene wherein the substituents identified in the parentheses are in a nonvicinal position on the benzene ring.

4. Bis(2-hydroxy-3,5-dichloro - α - methylbenzyl)benzene wherein the substituents identified in the parentheses are in a nonvicinal position on the benzene ring.

CLARENCE L. MOYLE.

REFERENCES CITED

The following references are of record in the file of this patent:

UNITED STATES PATENTS

| Number | Name | Date |
|---|---|---|
| 2,313,782 | Taylor et al. | Mar. 16, 1943 |